No. 694,639. Patented Mar. 4, 1902.
T. B. HATCH.
ELECTRIC MOTOR.
(Application filed Aug. 7, 1901.)
(No Model.) 2 Sheets—Sheet 1.
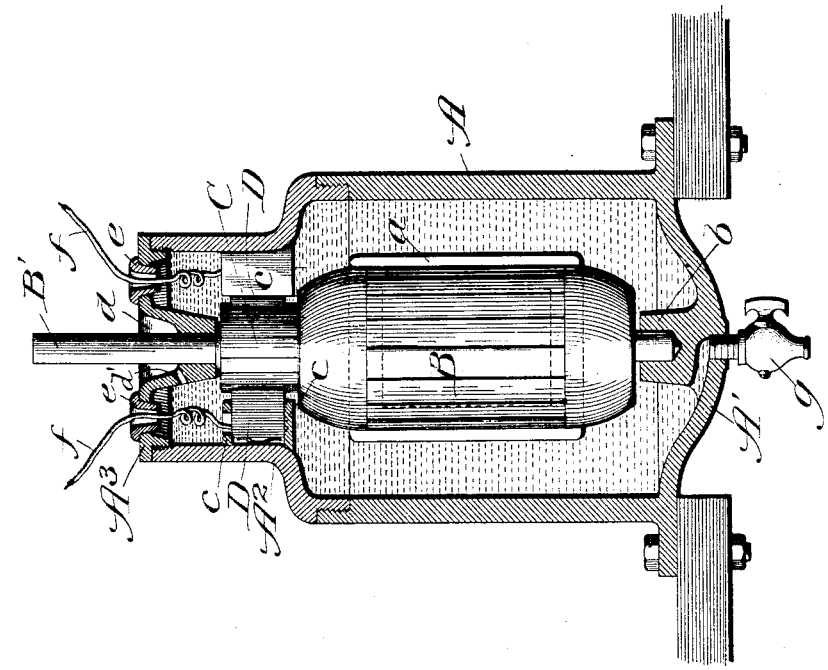
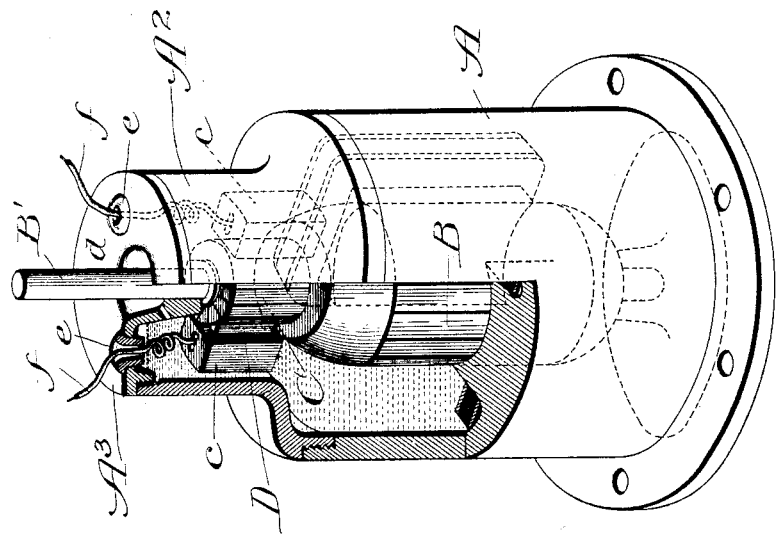
Witnesses:
Inventor
Tracy B. Hatch,
By Dyrenforth, Dyrenforth & Lee,
Att'ys.

UNITED STATES PATENT OFFICE.

TRACY B. HATCH, OF MENOMONIE, WISCONSIN, ASSIGNOR TO SUBMERGED ELECTRIC MOTOR COMPANY, OF MENOMONIE, WISCONSIN, A CORPORATION OF WISCONSIN.

ELECTRIC MOTOR.

SPECIFICATION forming part of Letters Patent No. 694,639, dated March 4, 1902.

Application filed August 7, 1901. Serial No. 71,155. (No model.)

*To all whom it may concern:*

Be it known that I, TRACY B. HATCH, a citizen of the United States, residing at Menomonie, in the county of Dunn and State of Wisconsin, have invented a new and useful Improvement in Electric Motors, of which the following is a specification.

My object is to provide an electric motor of an improved construction, adapting it more especially for use in places—such as mines, laundries, breweries, and the like—where the motor parts, if unprotected, would be exposed to the well-known deleterious influences of moisture or of other substances which may be contained in the surrounding atmosphere.

My object is further to provide a motor for the above purpose in which all the working parts will be protected from the access of deleterious substances thereto without the necessity of a stuffing-box about the motor-shaft.

Hitherto in providing electric motors for use in damp places it has been usual to inclose the motor in a moisture-excluding casing and provide a moisture-excluding stuffing-box about the motor-shaft where it extends to the outside of the casing. To properly answer its purpose, the stuffing-box must necessarily fit very closely about the shaft and cause such frictional resistance against the turning thereof as to greatly diminish the power of the motor.

In carrying out my invention in what I regard as the preferred form I provide a vessel which in itself forms the motor-field and is provided internally with field-magnets and bearings for an armature-shaft, all working parts of the motor being confined in the vessel, which is filled with a fluid sealing substance of low conductivity, preferably hydrocarbon oil, to operate instead of a stuffing-box to exclude the surrounding atmosphere and any deleterious substances with which it may be charged. The hydrocarbon oil also exerts a cooling influence upon the motor-windings and will operate to prevent sparking between a commutator and its brushes.

Figure 3:
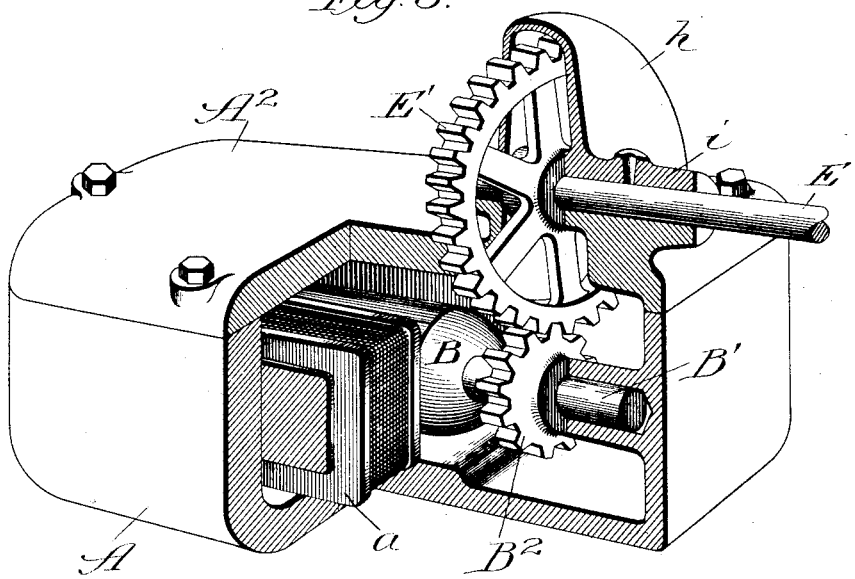

In the drawings, Figure 1 is a perspective view of my improved motor in one form, a part of the casing or field being broken away to show interior parts, which are further indicated by dotted lines; Fig. 2, a vertical section of the motor shown in Fig. 1; Fig. 3, a broken perspective view of a back-geared motor of my improved construction, and Fig. 4 a broken sectional plan view of the construction shown in Fig. 3 with the cover portion removed.

A is the body portion of a vessel or casing, forming a motor-field and provided on its inner side with suitably-wound electromagnets $a$. The vessel or casing has a base A' and is fitted at its upper end with a covering portion $A^2$.

B is a rotating armature of any suitable construction upon an armature-shaft B', which may also carry a commutator C.

In the construction shown in Figs. 1 and 2 the casing A is cylindrical, and the base A' is provided with a central bearing $b$ for the lower end of the armature-shaft. The covering portion $A^2$ is like the neck portion of a jar or flask and is screwed into the top of the body portion. The part $A^2$ is provided with a screw-cap $A^3$. In the part or neck portion $A^2$, at opposite sides of the commutator C, are holders $c$ for plunger-brushes D. The cap $A^3$ is dished to form a recess $d$ about a central bearing-opening for the armature-shaft. In the cap are openings into which are fitted hollow insulating-plugs $e$, through which the wires $f$ pass to the brushes. In the recess $d$ is a filling-opening $d'$, and in the base A' is a discharge-cock $g$, which is opened only when it is desired to draw liquid from the vessel.

The vessel is filled to a point above the commutator with a suitable fluid, which is preferably hydrocarbon oil. The oil I prefer to employ is of a thin quality in order that it may offer as little frictional resistance as possible to the rotation of the armature. Hydrocarbon oil is a better insulator than atmospheric air, so that in this respect it is a benefit. The bearing-opening in the cap-piece is sufficiently large to hold the shaft steady without material friction, and the hydrocarbon oil prevents any water or the like that may enter through the shaft-bearing from adhering to the moving parts of the motor in the casing. The oil, furthermore, lubricates the bearings. As any substance that could enter through the bearing would have to be of greater specific gravity than the oil, it would sink to the bottom of the vessel and could be drawn off through the cock $g$.

Figure 4:
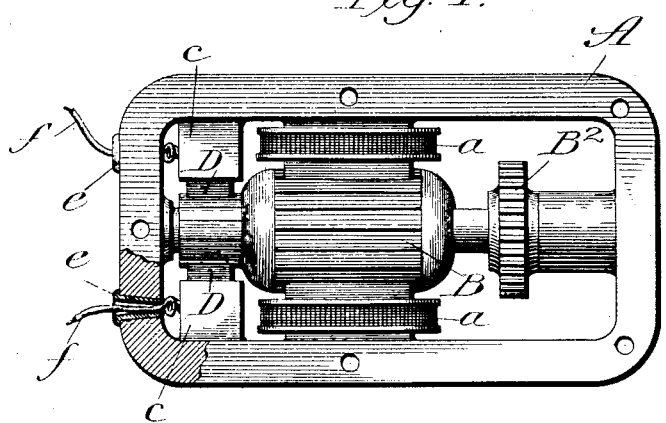

In the construction shown in Figs. 3 and 4 the body portion A extends horizontally and has bearing-sockets in its opposite ends for a horizontal armature-shaft B'. The brush-holders $c$ for the plunger-brushes D are in the body portion at opposite sides of the chamber, and the conductor-wires $f$ extend through the end of the body portion just beneath its top. The cover portion $A^2$ is in the form of a cap-plate, which may be bolted in place, as indicated. The cover $A^2$ is formed with a housing portion $h$ and a horizontal bearing $i$ for a shaft E. On the shaft E is a gear-wheel E', meshing with a pinion $B^2$ on the armature-shaft. No stuffing-box is required for the shaft E, and the body portion A is filled to the insulated openings $e$ with hydrocarbon oil for the same purpose as in the other construction.

It would be possible, of course, to provide a motor of suitable construction and place it with its field and other parts in a vessel containing hydrocarbon oil or equivalent sealing fluid; but such a construction would be less desirable than one in which the vessel for containing the hydrocarbon itself constitutes or forms a part of the motor-field.

Although, as before stated, the hydrocarbon oil offers slight frictional resistance to the turning of the armature and parts moving therewith, this resistance may be but slight, while the advantages gained by the use of hydrocarbon oil in lubricating the parts, keeping them cool, excluding moisture, &c., and avoiding the necessity of a stuffing-box greatly increase the efficiency of the motor.

Although I have herein shown and described a machine in which a stationary field surrounds a rotary armature, my invention is not to be limited thereto. There are other constructions—for example, wherein the armature surrounds the field or the armature is stationary while the field rotates—to which my invention may be applied if found desirable, and while I have shown and described a motor of a construction employing a commutator and brushes my invention is not to be limited thereto. It will be obvious that the constructions shown may be variously modified without departing from the spirit of my invention as defined by the claims.

What I claim as new, and desire to secure by Letters Patent, is—

1. In an electric motor, coöperating members forming, respectively, the field and the armature mounted one within the other, the outer one of said two members being a liquid-holding vessel.

2. In an electric motor, coöperating members forming, respectively, the field and the armature mounted one within the other, the outer one of said two members being a liquid-holding vessel, and a liquid sealing substance, of low conductivity, in said vessel surrounding and sealing the inner one of said members.

3. In an electric motor, a liquid-holding vessel forming the motor-field and containing the moving members of the motor, and a liquid sealing substance in the vessel enveloping said moving members, substantially as and for the purpose set forth.

4. An electric motor, comprising a vessel forming the motor-field, and adapted to contain a fluid sealing substance of low conductivity, such as hydrocarbon oil, for surrounding and sealing the moving members of the motor, substantially as and for the purpose set forth.

5. In an electric motor, the combination of a closed vessel forming the motor-field and containing all the moving members of the motor, field-magnets on the inner wall of the vessel, a liquid sealing substance contained in the vessel and enveloping all the said moving members, and an opening in the upper part of the vessel for the passage of a rotary power-shaft, substantially as described.

6. In an electric motor, the combination of a closed vessel forming the field and containing all the moving members of the motor, a shaft in the upper part of and extending through a bearing-opening in said vessel, said shaft being rotated by the said moving members, and a liquid sealing substance in the vessel enveloping all the said moving members, substantially as described.

TRACY B. HATCH.

In presence of—
D. W. LEE,
ALBERT D. BACCI.